US012766904B2

(12) United States Patent
Petrina et al.

(10) Patent No.: US 12,766,904 B2
(45) Date of Patent: Oct. 20, 2026

(54) ADJUSTABLE CONTROL ARM AND BALL JOINT ASSEMBLY

(71) Applicant: RB Distribution, Inc., Colmar, PA (US)

(72) Inventors: Jonathan Petrina, Glenside, PA (US); Thomas Reiff, Portage, MI (US)

(73) Assignee: RB Distribution, Inc., Colmar, PA (US)

( * ) Notice: Subject to any disclaimer, the term of this patent is extended or adjusted under 35 U.S.C. 154(b) by 310 days.

(21) Appl. No.: 18/204,296

(22) Filed: May 31, 2023

(65) Prior Publication Data

US 2024/0399806 A1 Dec. 5, 2024

(51) Int. Cl.
*B60G 7/00* (2006.01)

(52) U.S. Cl.
CPC ............. *B60G 7/003* (2013.01); *B60G 7/005* (2013.01)

(58) Field of Classification Search
CPC .. B60G 7/003; B60G 7/005; B60G 2204/143; B60G 2204/148; B60G 7/02; B60G 2204/416; B60G 7/001
See application file for complete search history.

(56) References Cited

U.S. PATENT DOCUMENTS 4,372,575 A * 2/1983 Hyma .................... B62D 17/00 267/221
4,695,073 A * 9/1987 Pettibone ............... B62D 17/00 280/86.757
5,931,485 A * 8/1999 Modinger .............. B62D 17/00 280/86.75
6,293,724 B1 9/2001 Spears et al.
7,278,648 B2 * 10/2007 Bobbitt, III ............ B62D 17/00 280/124.123
7,513,514 B1 4/2009 Schlosser et al.
8,544,861 B2 10/2013 Frens
8,925,944 B2 1/2015 Byrnes
9,327,570 B2 5/2016 Karpman et al.
9,751,370 B2 9/2017 Weifenbach et al.
10,155,424 B1 12/2018 Elterman
10,450,005 B2 10/2019 Weifenbach et al.
10,814,535 B2 10/2020 Lee et al.
10,953,577 B2 3/2021 Lee et al.
10,994,580 B1 * 5/2021 Ryshavy ................ B62D 17/00
11,131,337 B1 9/2021 Miller et al.
11,241,928 B2 2/2022 Kim et al.
11,491,837 B2 11/2022 Kim et al.
11,499,589 B2 11/2022 Miller et al.
2008/0303233 A1 * 12/2008 Dugandzic ............. B62D 17/00 280/86.751

FOREIGN PATENT DOCUMENTS

DE 2303102 A1 * 7/1974 ............. B60G 7/005

* cited by examiner

*Primary Examiner* — Jason D Shanske
(74) *Attorney, Agent, or Firm* — Volpe Koenig

(57) ABSTRACT

A control arm and a ball assembly that are adjustable relative to each other through a series of slots. The control arm mounts to a vehicle in the usual manner and the position of the ball joint assembly is adjustable by moving the ball joint assembly relative to the control arm and fastened in a desired position.

18 Claims, 20 Drawing Sheets

ADJUSTABLE CONTROL ARM AND BALL JOINT ASSEMBLY

BACKGROUND

Control arms are an important component of a vehicle's suspension that allow up and down movement of the suspension while securing the steering knuckles, spindles, and axles to the vehicle and in proper alignment. Control arms have undergone many changes as a result of automotive design and manufacturing technology.

Most modern control arms are adjustable control arms that permit a mechanic to adjust the vertical alignment or camber of the vehicle's wheels. Camber can be negative, the top of the wheel is tilted in, or positive, the top of the wheel is tilted out. Proper adjustment of camber can be major concern in damage repair, racing, and the lowering or lifting a vehicle from a stock position.

When one of these conditions arises with a car or truck, the issue is often addressed by installing adjustable control arms to correct the vehicle's camber. However, many of these solutions require the purchase of a particular control arm that addresses the specific, identified problem. This results in there being multiple replacement control arms, which can create supply and inventory problems.

SUMMARY

The disclosed control arm embodiments have a control arm and a ball joint carrier that are adjustable relative to each other to provide a greater range of adjustment and installation options. The control arm mounts to a vehicle and receives a ball joint assembly in an adjustable connection formed through coincident slots. The adjustable connection is fixed by a fastener in the coincident fastener slots when a desired position is reached by moving the ball joint assembly relative to the control arm.

DETAILED DESCRIPTION

Figure 1:
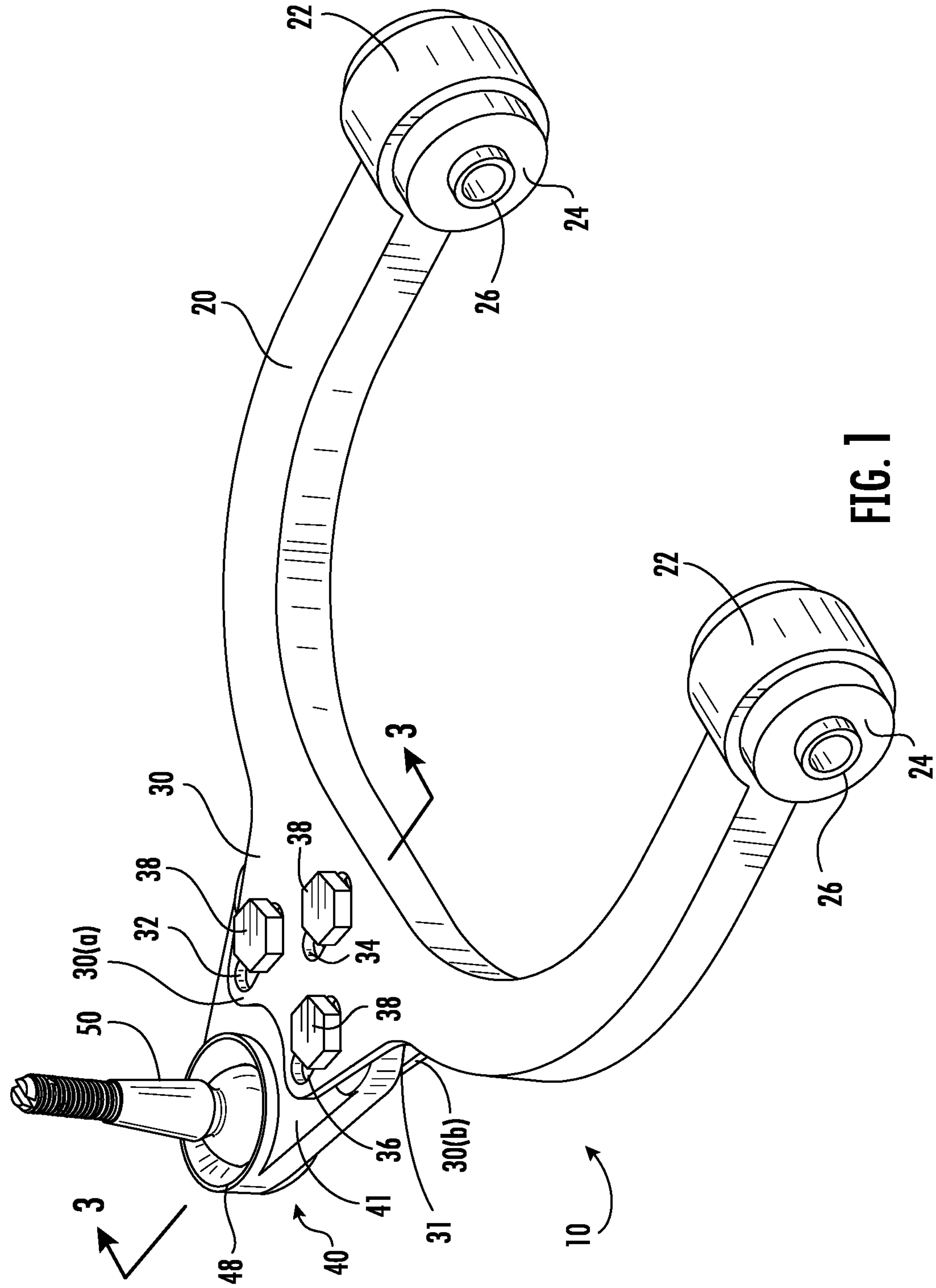
FIG. 1 is a perspective view of an adjustable control arm and ball joint assembly.

Embodiments of the adjustable control arm and ball joint assembly will be described in detail with reference to the drawings where a same or similar element is identified with the same indicator throughout the description.

An adjustable control arm and ball joint assembly 10 is illustrated in FIGS. 1 through 9. The illustrated assembly 10 has a frame portion 20 and ball joint assembly 40. The frame 20 has mounting ends 22 that secure the frame 20 to a vehicle and a connecting arcuate or arched portion with a free end 30. Each end 22 is illustrated with a bushing 24 and steel sleeve 26; however, these components, end 22, bushing 24, and sleeve 26, may be varied according to the specific vehicle application.

Figure 2:
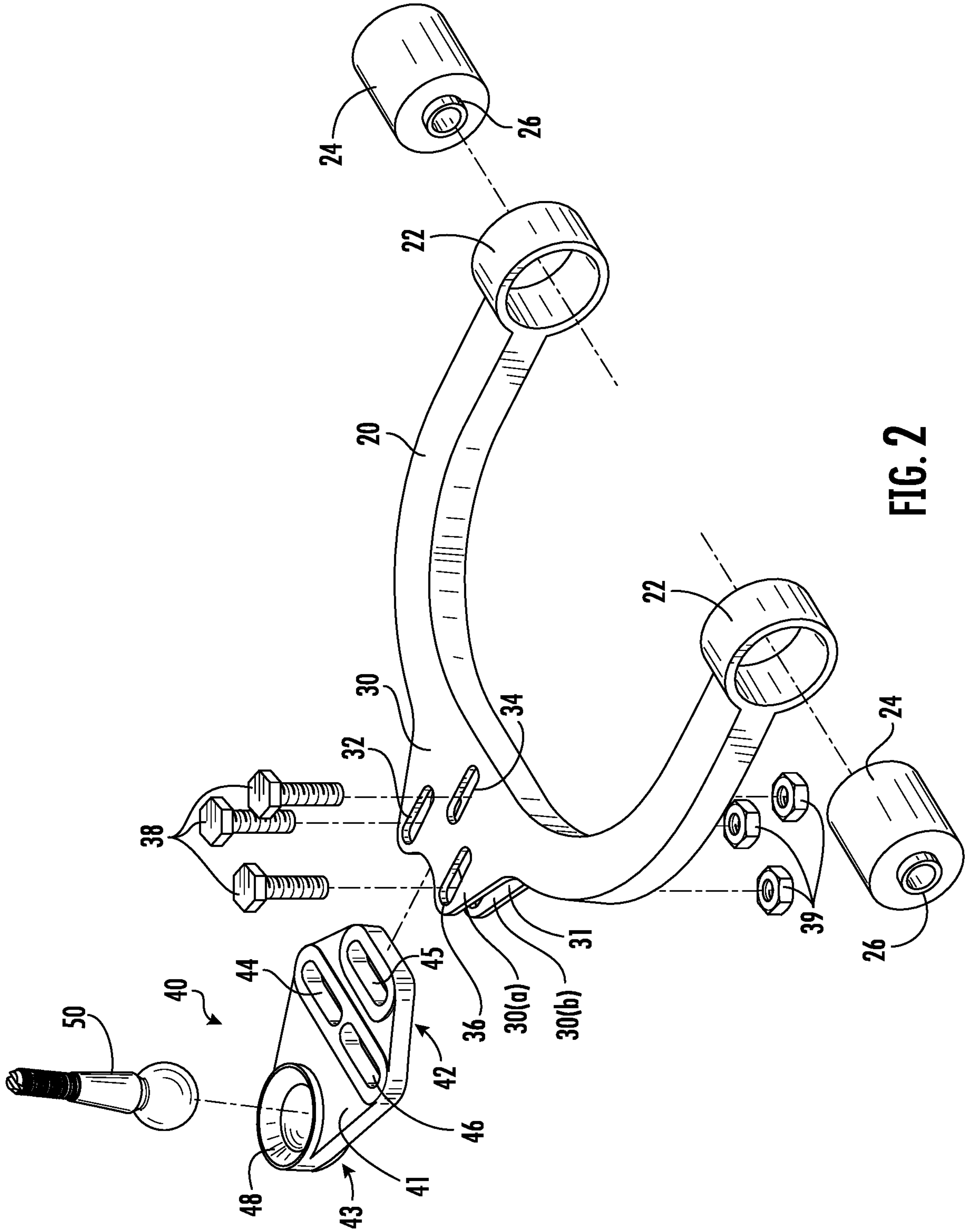
FIG. 2 is an exploded view of the adjustable control arm and ball joint assembly in FIG. 1.

The free end 30 of the frame 20 has a plurality of slots 32, 34, and 36 for the passage of fasteners, such as bolts 38, which may be secured with nuts 39. The slots 32, 34, and 36 are shown here as elongated with a major axis oriented in a first direction and parallel sides. The free end 30 has upper and lower portions 30(*a*) and 30(*b*) that define a recess 31 for the ball joint assembly 40. The carrier 41 has a lead end 42 with slots 44, 45, and 46 which are also shown as elongated with parallel sides and a major axis oriented in a second direction that intersects the major axis of the slots 32, 34, and 36. As shown in FIG. 2, the major axes of slots 32, 34, and 36 are parallel to each other, but the slots are staggered or offset with respect to each other. Likewise, the major axes of slots 44, 45, and 46 are parallel to each other, but the slots are staggered or offset with respect to each other.

With reference to FIGS. 1 and 2, carrier 41 of the ball joint assembly 40 has a lead end 42 that is dimension to be received in the recess 31 formed by upper and lower portions 30(*a*) and 30(*b*) of the free end 30. The trailing end 43 of carrier 41 has a socket 48 and a ball joint 50. Socket 48 and ball joint 50 may vary according to the specific vehicle application.

Figure 3:
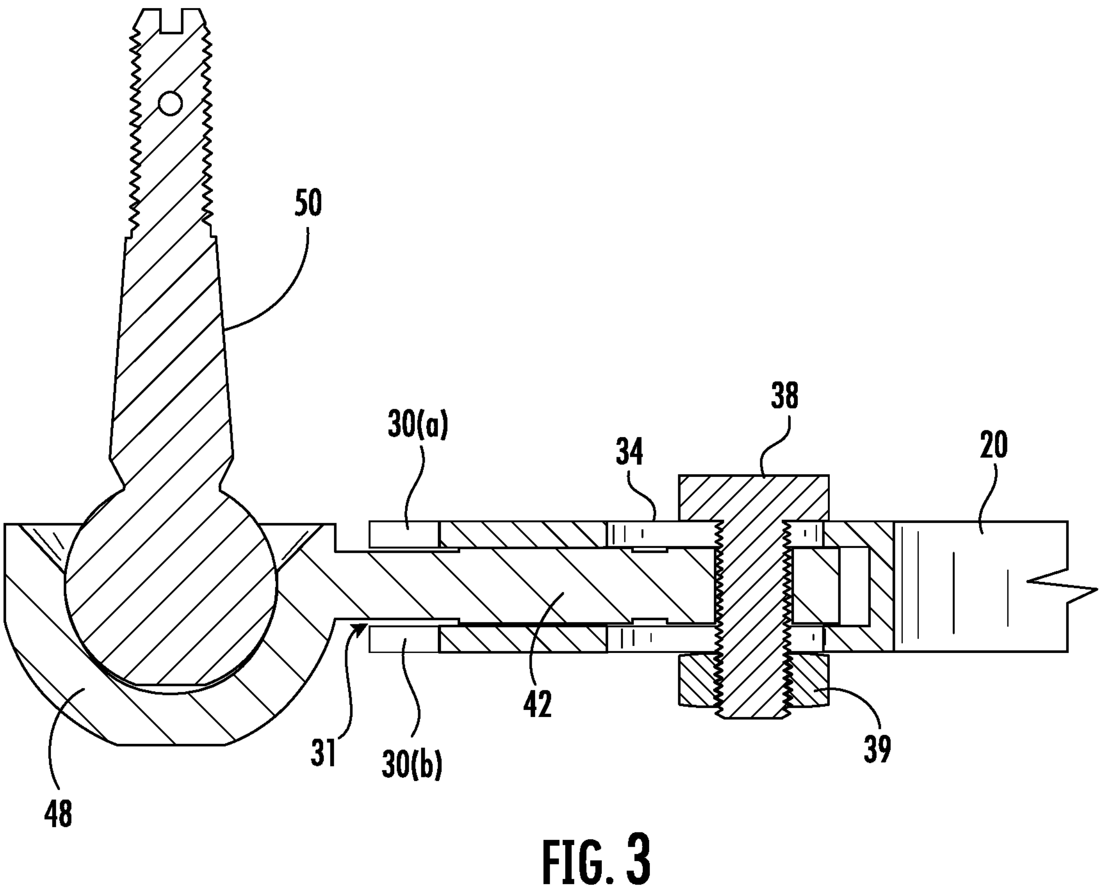
FIG. 3 is a section along the line 3-3 in FIG. 1.
Figure 4:
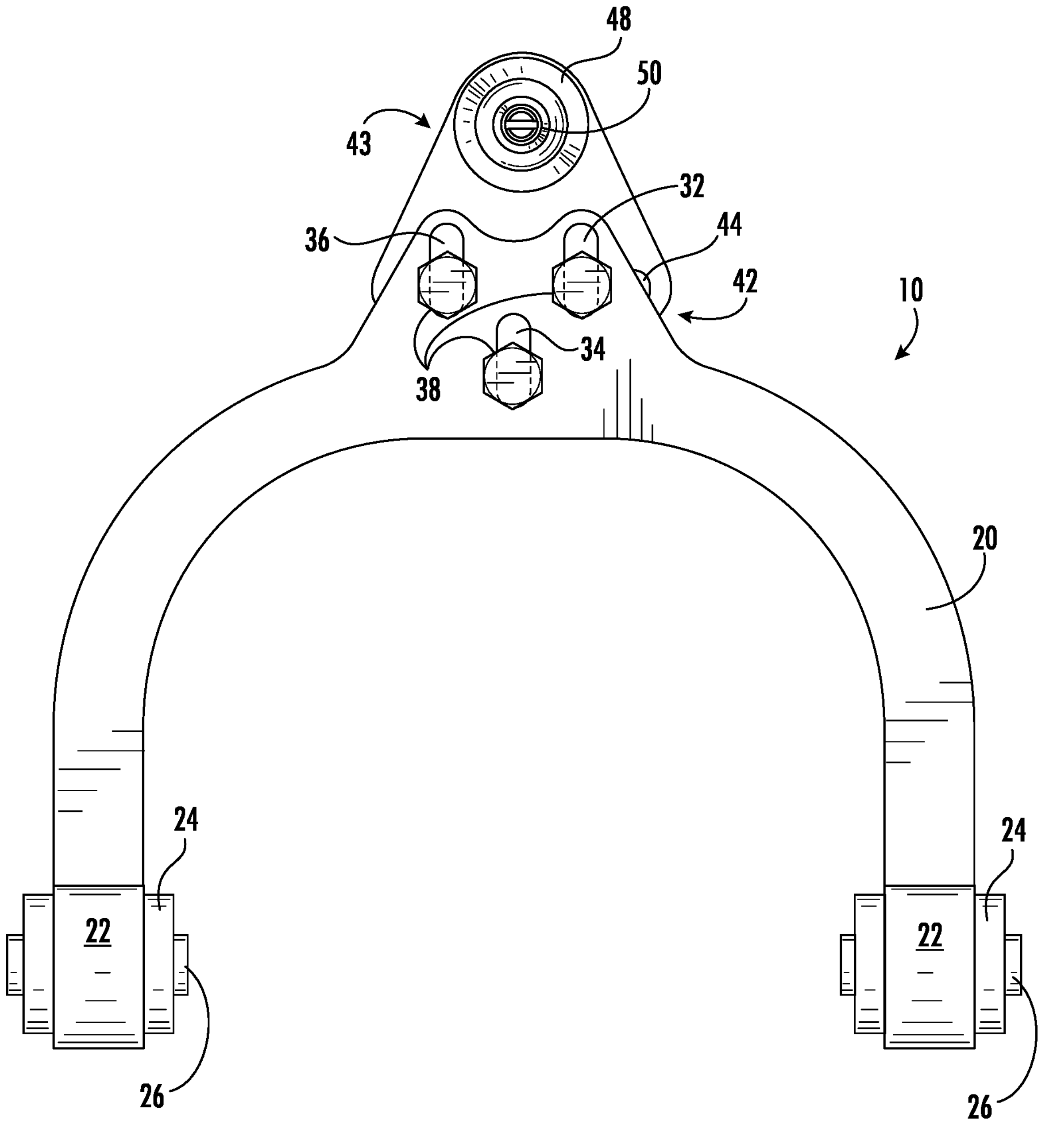
FIG. 4 is a top view of the adjustable control arm and ball joint assembly in FIG. 1.
Figure 5:
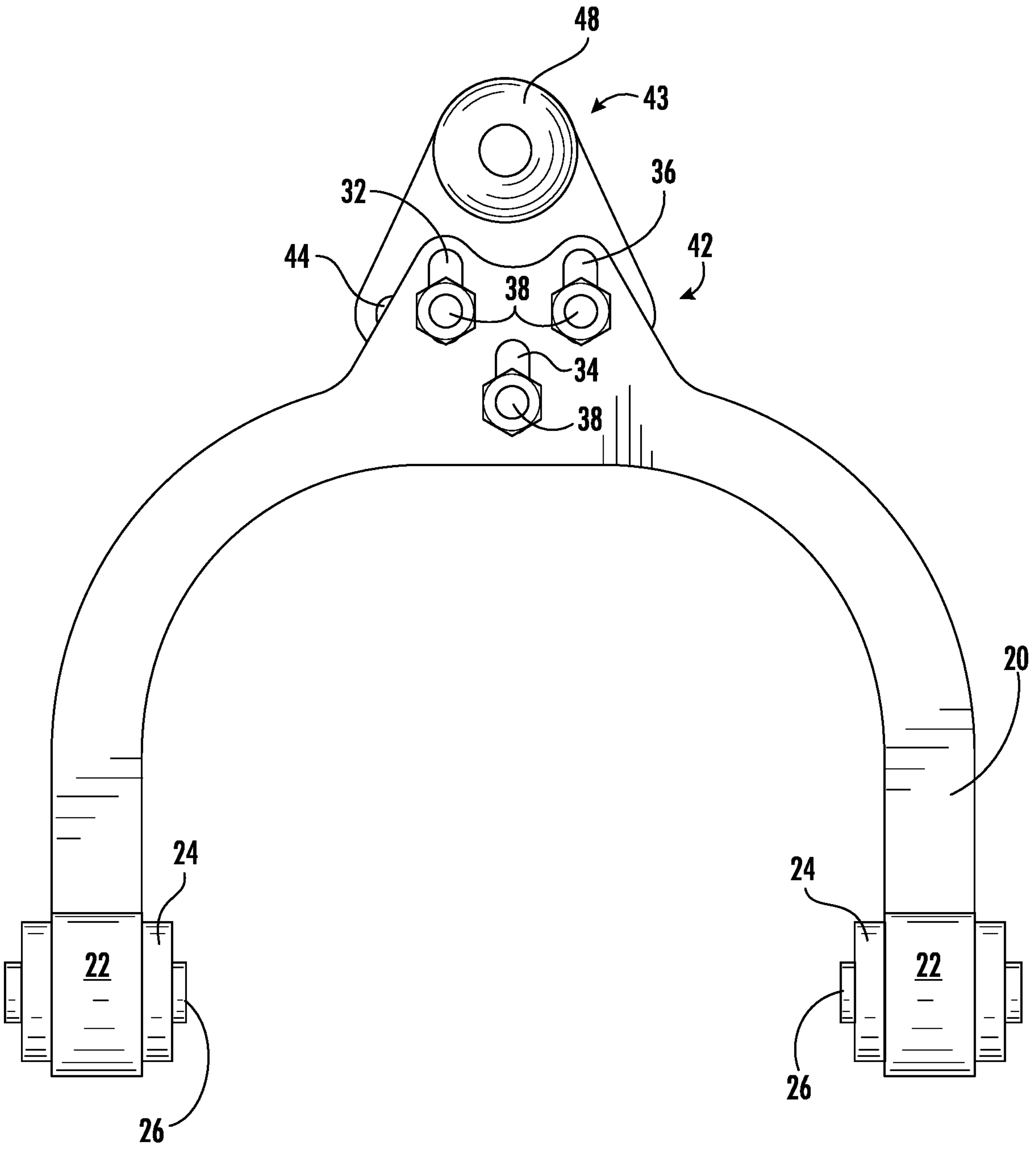
FIG. 5 is a bottom view of the adjustable control arm and ball joint assembly in FIG. 1.
Figure 6:
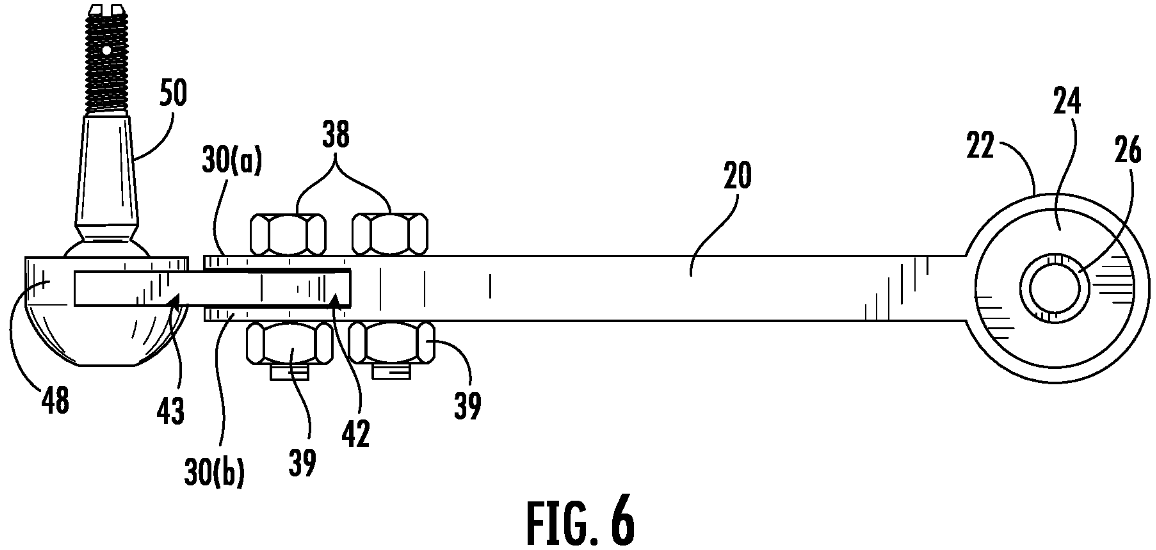
FIG. 6 is a front view of the adjustable control arm and ball joint assembly in FIG. 1.
Figure 7:
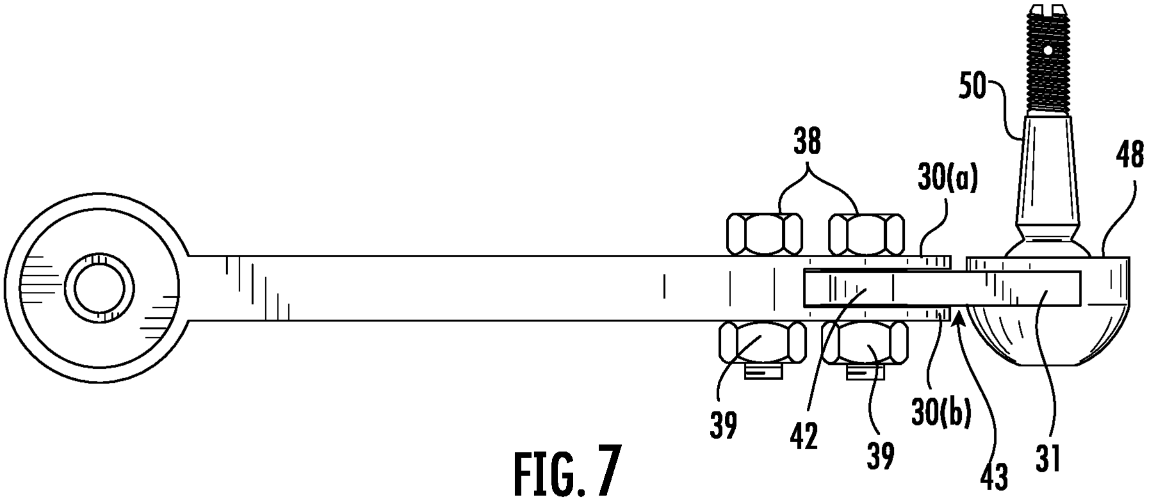
FIG. 7 is a rear view of the adjustable control arm and ball joint assembly in FIG. 1.
Figure 8:
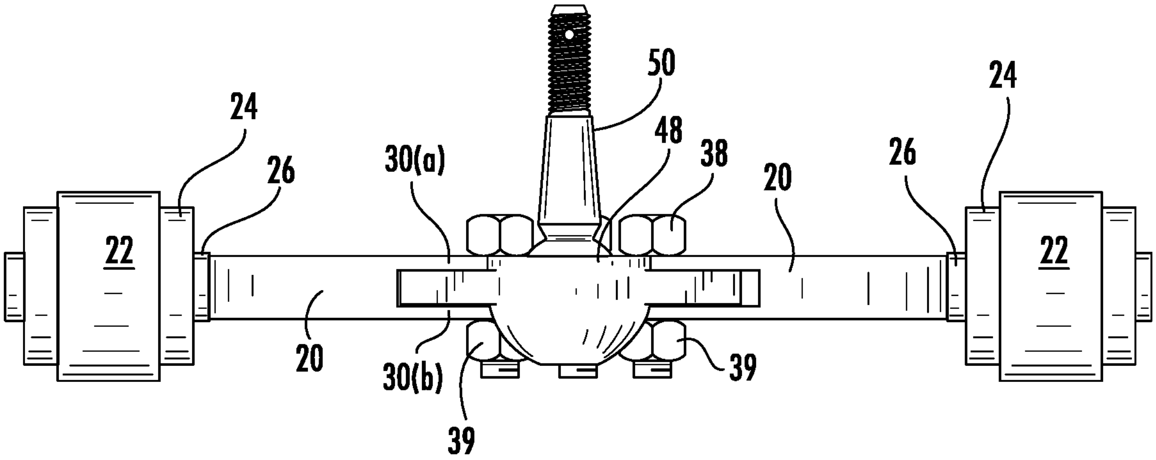
FIG. 8 is a left side view of the adjustable control arm and ball joint assembly in FIG. 1.
Figure 9:
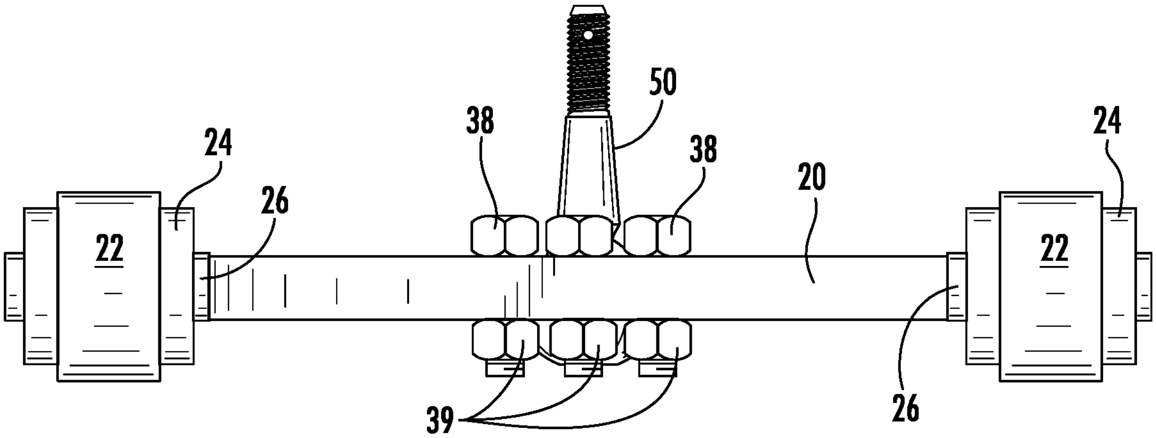
FIG. 9 is a right side view of the adjustable control arm and ball joint assembly in FIG. 1.

With reference to FIG. 3, it can be seen that lead end 42 of the carrier 41 can move along both major axes within the recess 31 of the free end 30. Thus, the position of carrier 41 is adjustable along the lengths of the major axes of slots 32, 34, and 36 and the lengths of major axes 44, 45, and 46 to a desired position where slots with a major axis oriented in a first direction are coincident with the slots having a major axis oriented in a second direction such that a fastener, such as bolt 38, passes through the slots and is tightened against the upper and lower portions 30(*a*) and 30(*b*) with a complementary component, such as nut 39.

Another adjustable control arm and ball joint assembly 200 is illustrated in FIGS. 10 through 18. The illustrated assembly 200 has a frame portion 210 and ball joint assembly 230. The frame 200 has mounting ends 215 and 216 secure the frame 200 to a vehicle. The ends 215 and 216 are illustrated without a bushing or steel sleeve; as noted before, the ends 215 and 216 may vary according to the specific vehicle application.

Figure 10:
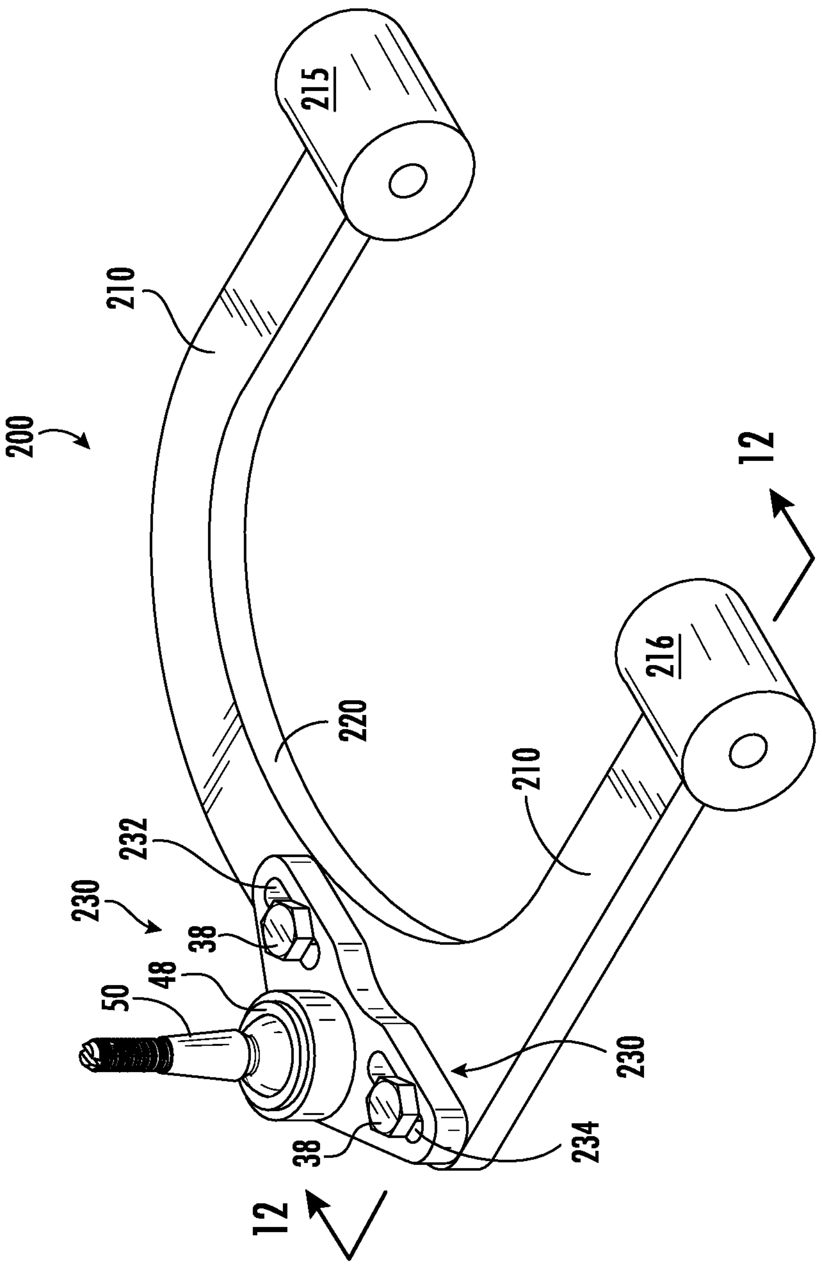
FIG. 10 is a perspective view of another adjustable control arm and ball joint assembly.
Figure 11:
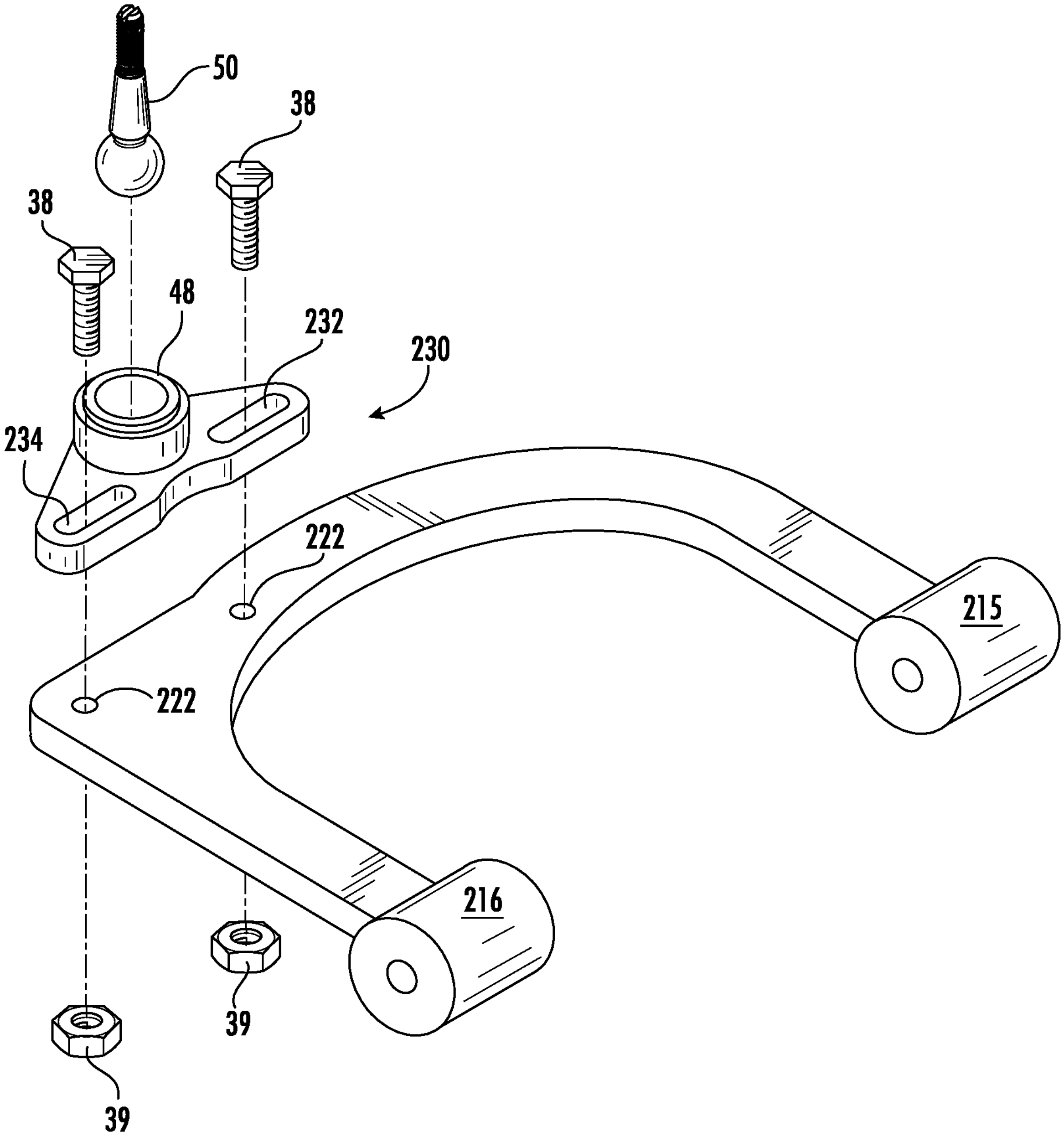
FIG. 11 is an exploded view of the adjustable control arm and ball joint assembly in FIG. 10.

With reference to FIGS. 10 and 11, the frame of assembly 200 has extensions 210 that extend away from mounting ends 215 and 216 to an arcuate or arched portion 220. The arched portion 220 has a pair of through apertures 222 for fasteners, such as bolts 38, which may be secured with nuts 39. The ball joint carrier 230 has slots 232 and 234. The slots 232 and 234, as illustrated, are non-circular with a major axis, a minor axis, and parallel sides. The slots 232 and 234 are spaced to coincide with the spacing of apertures 222 and enable passage of the bolts 38. The assembly 230 includes a socket 48 and a ball joint 50. The position of carrier 230 can be adjusted along the major axis of slots 232 and 234 over the length of the slots 232 and 234 while incident with apertures 222 to allow bolts 38 to pass through.

Figure 12:
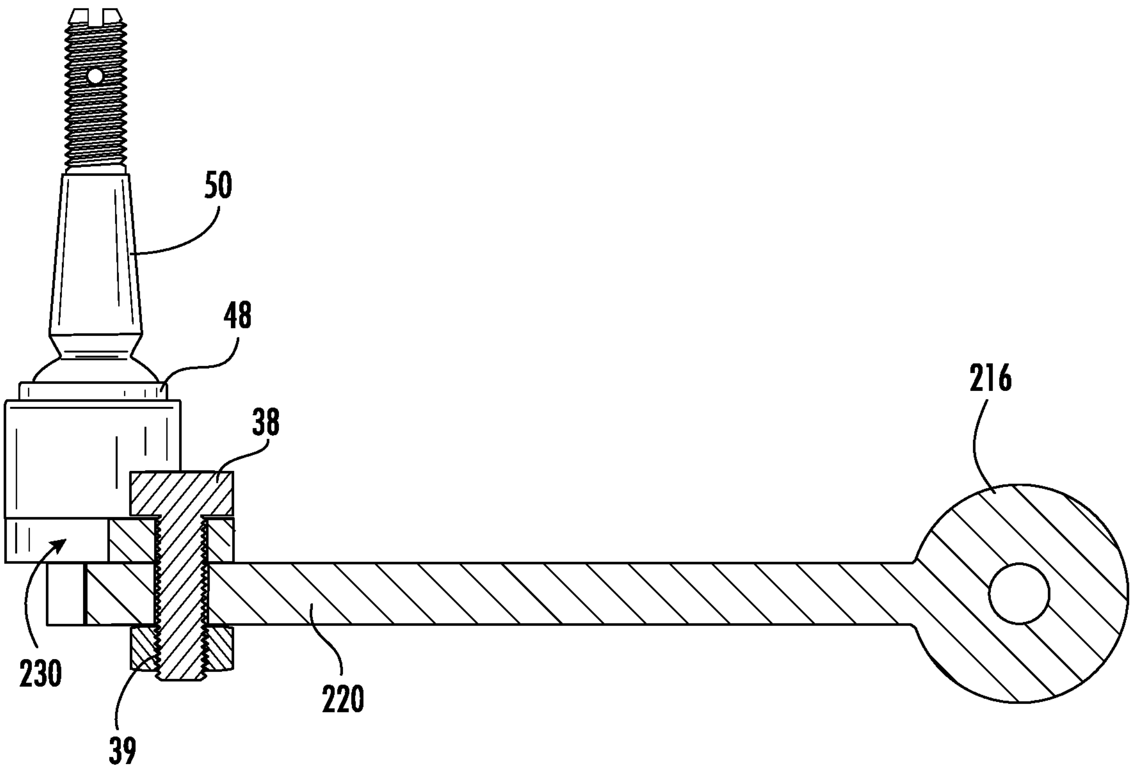
FIG. 12 is a section along the line 12-12 in FIG. 10.
Figure 13:
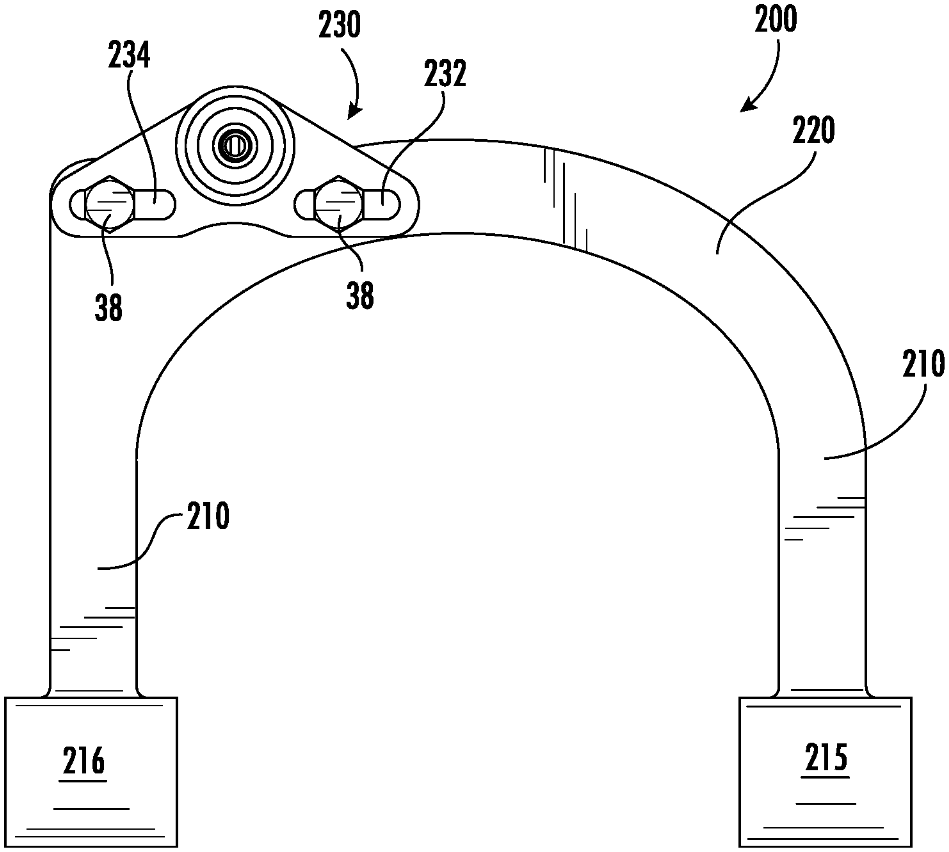
FIG. 13 is a top view of the adjustable control arm and ball joint assembly in FIG. 10.
Figure 14:
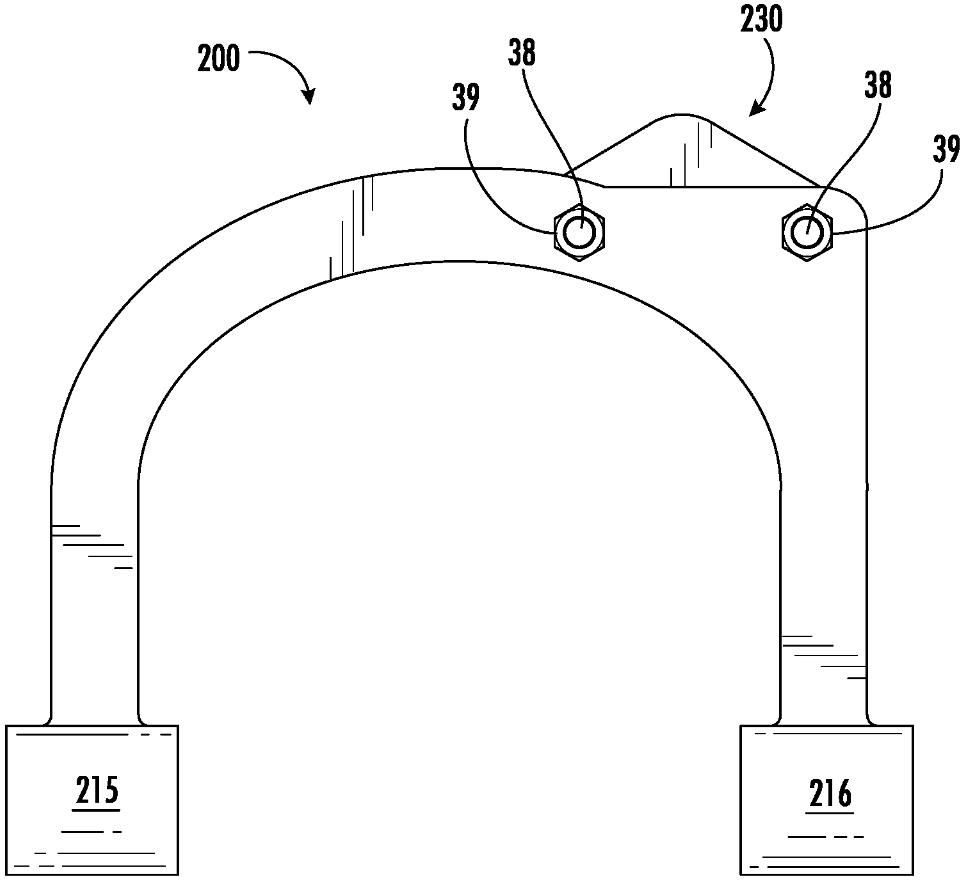
FIG. 14 is a bottom view of the adjustable control arm and ball joint assembly in FIG. 10.
Figure 15:
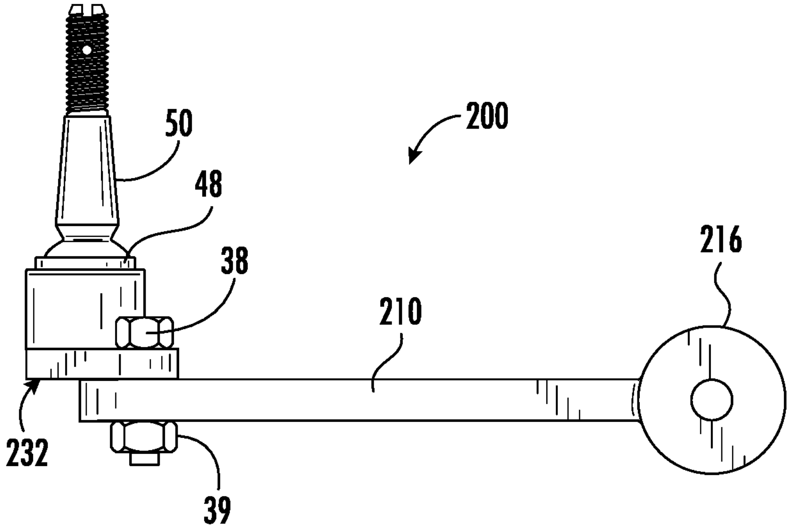
FIG. 15 is a front view of the adjustable control arm and ball joint assembly in FIG. 10.
Figure 16:
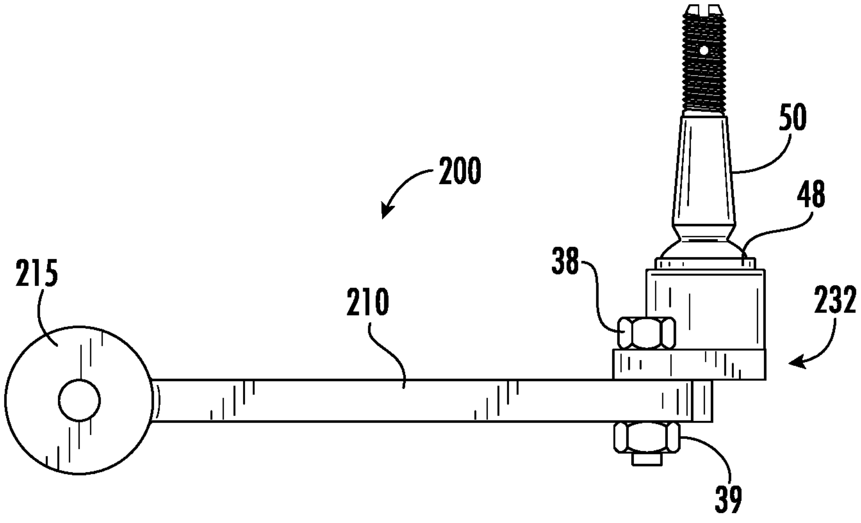
FIG. 16 is a rear view of the adjustable control arm and ball joint assembly in FIG. 10.
Figure 17:
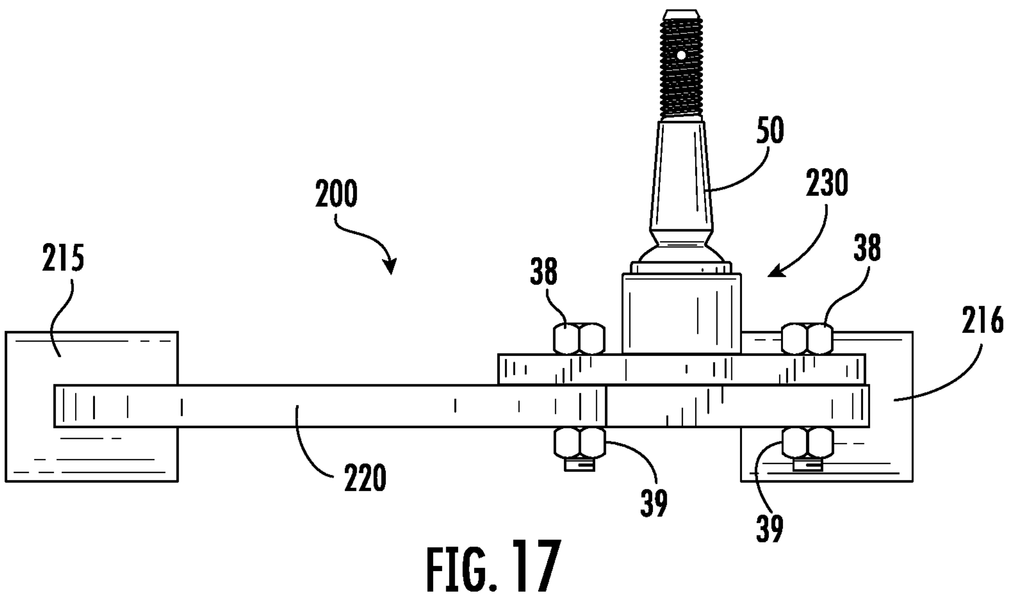
FIG. 17 is a left side view of the adjustable control arm and ball joint assembly in FIG. 10.
Figure 18:
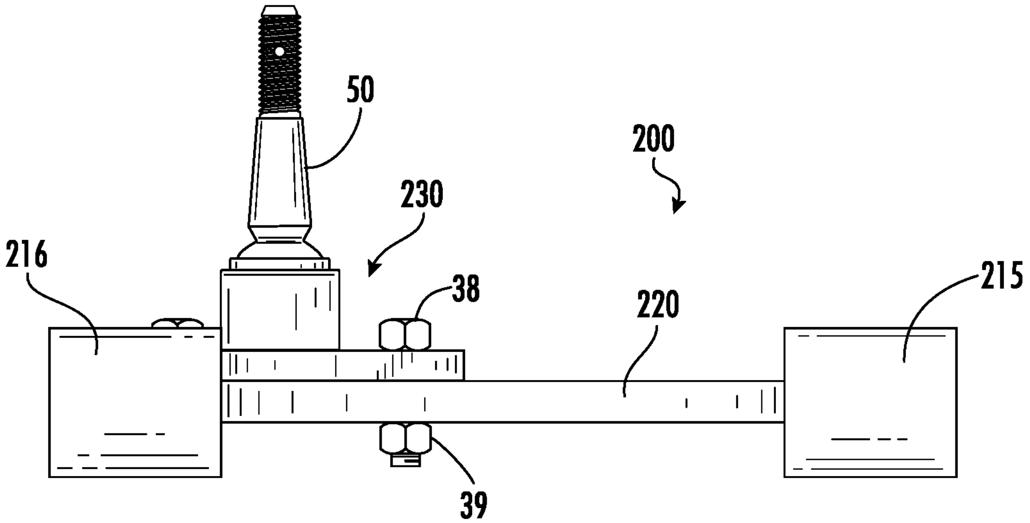
FIG. 18 is a right side view of the adjustable control arm and ball joint assembly in FIG. 10.
Figure 19:
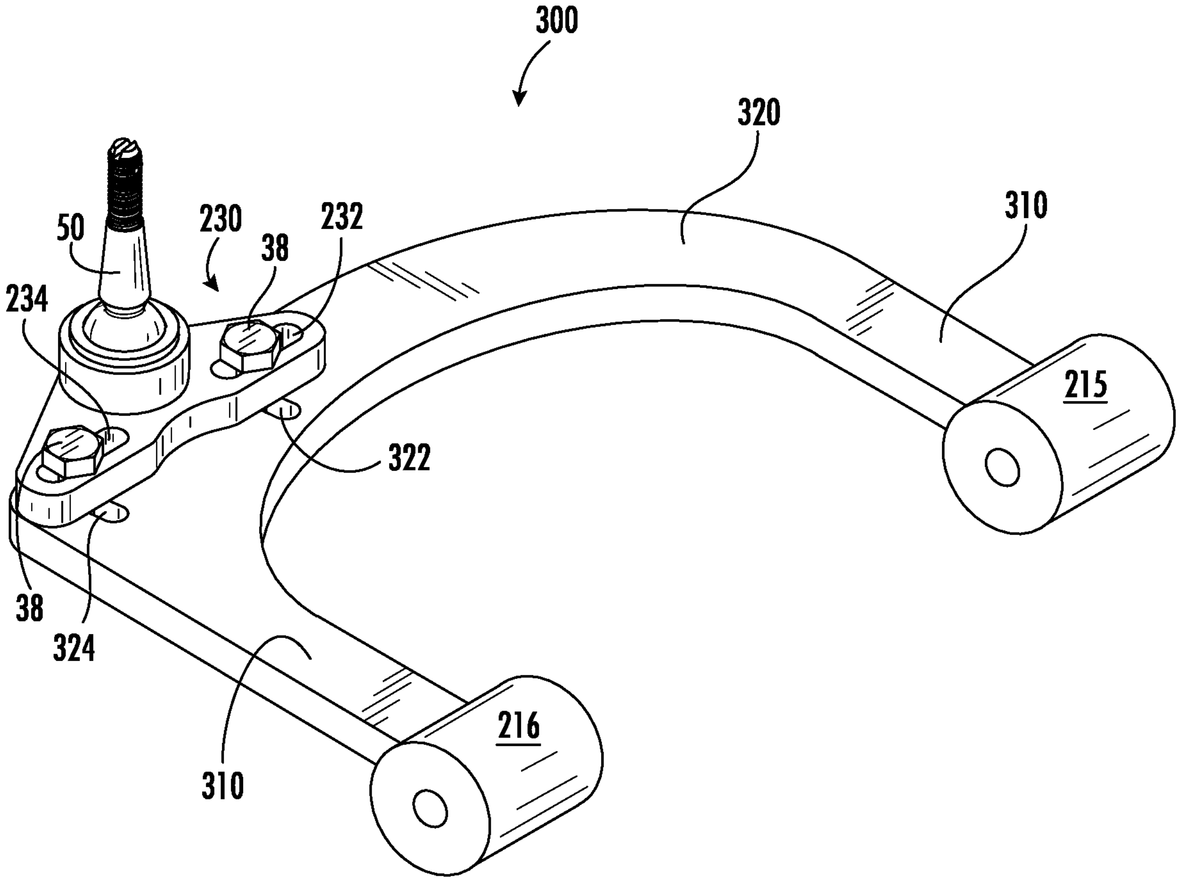
FIG. 19 is a perspective view of another adjustable control arm and ball joint assembly.
Figure 20:
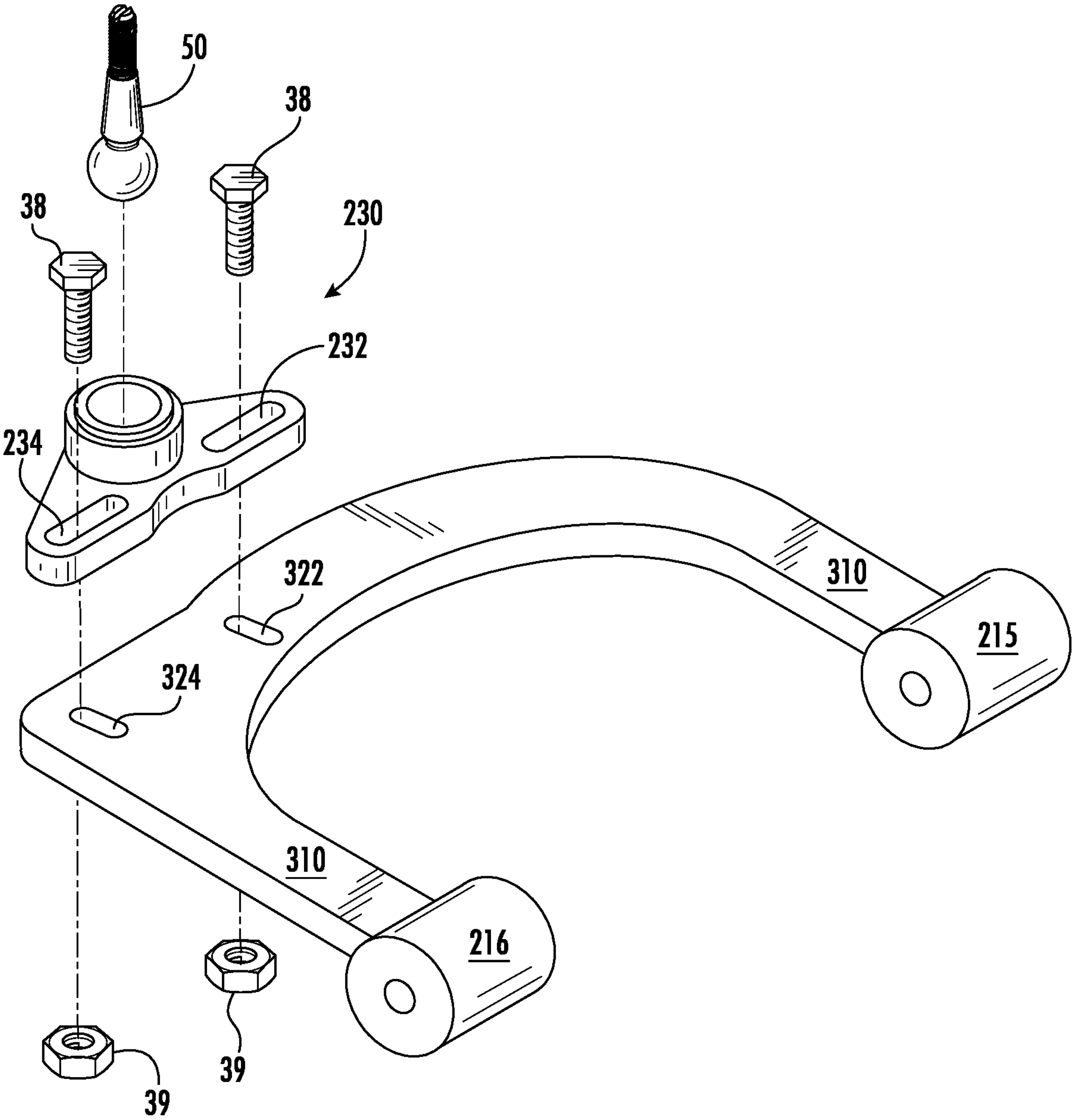
FIG. 20 is an exploded view of the adjustable control arm and ball joint assembly in FIG. 19.
Figure 21:
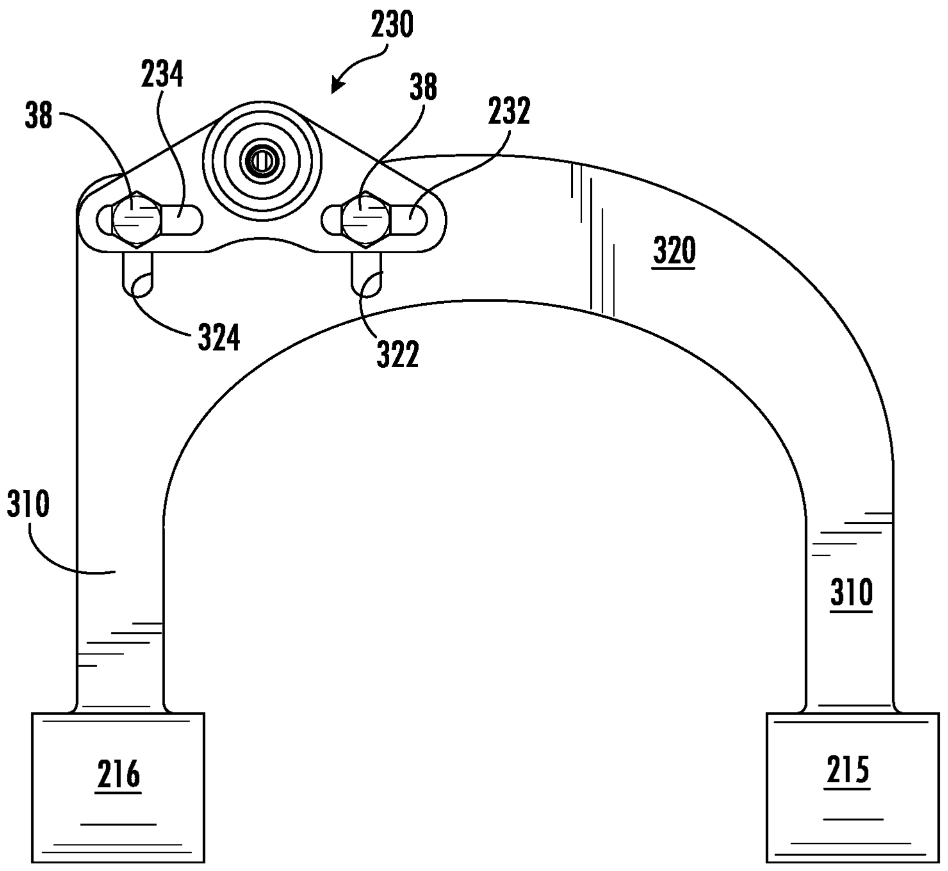
FIG. 21 is a top view of the adjustable control arm and ball joint assembly in FIG. 19.
Figure 22:
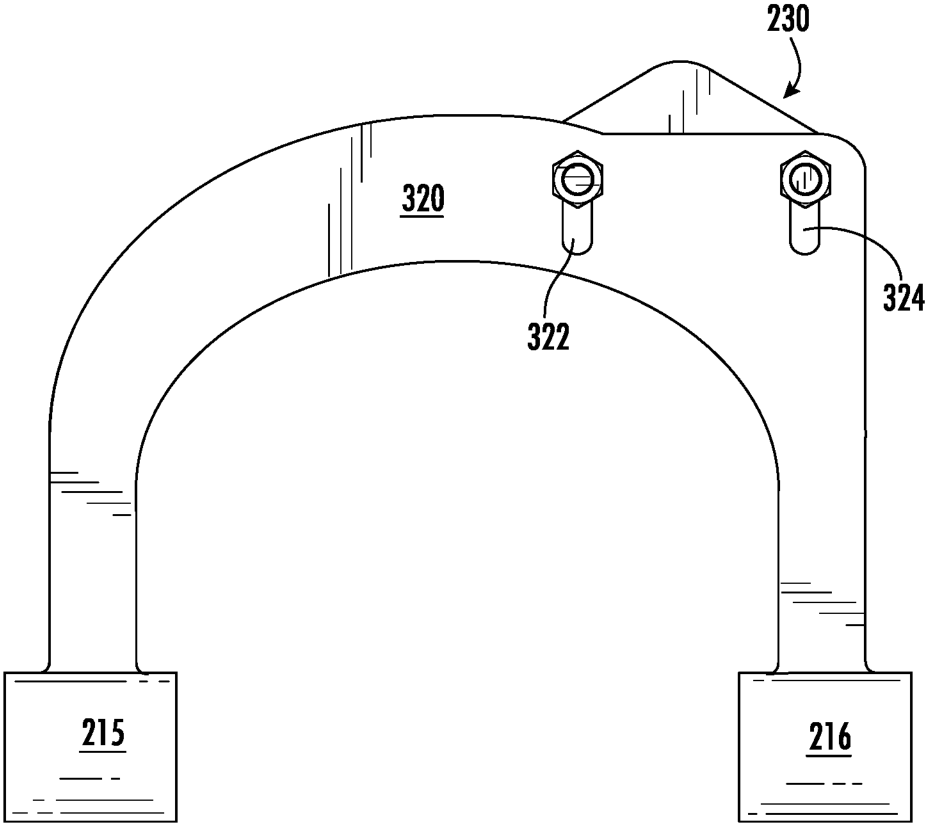
FIG. 22 is a bottom view of the adjustable control arm and ball joint assembly in FIG. 19.
Figure 23:
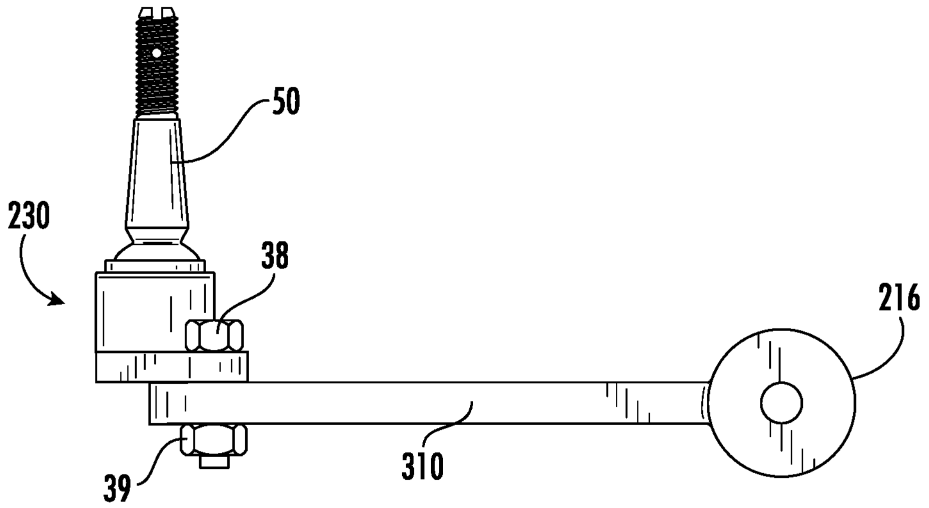
FIG. 23 is a front view of the adjustable control arm and ball joint assembly in FIG. 19.
Figure 24:
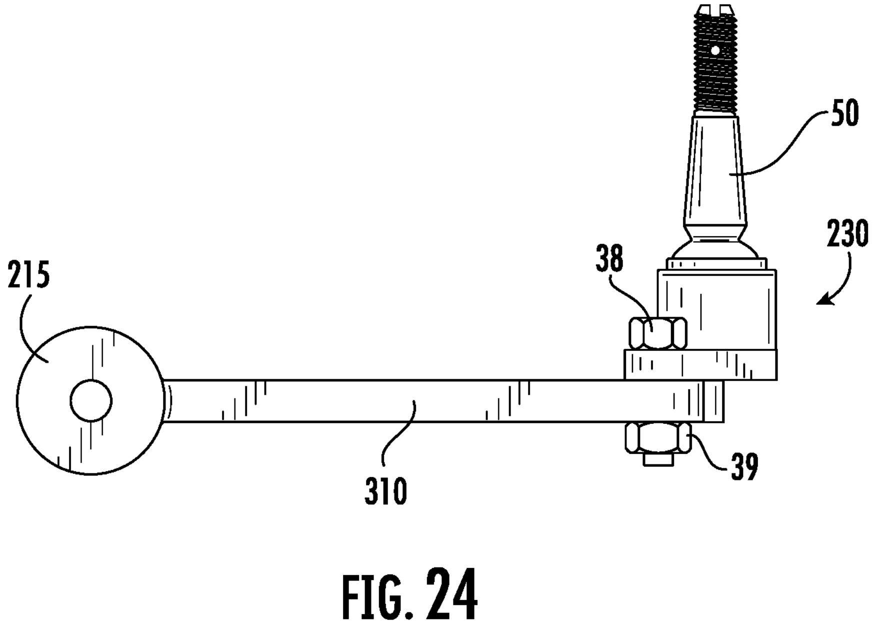
FIG. 24 is a rear view of the adjustable control arm and ball joint assembly in FIG. 19.
Figure 25:
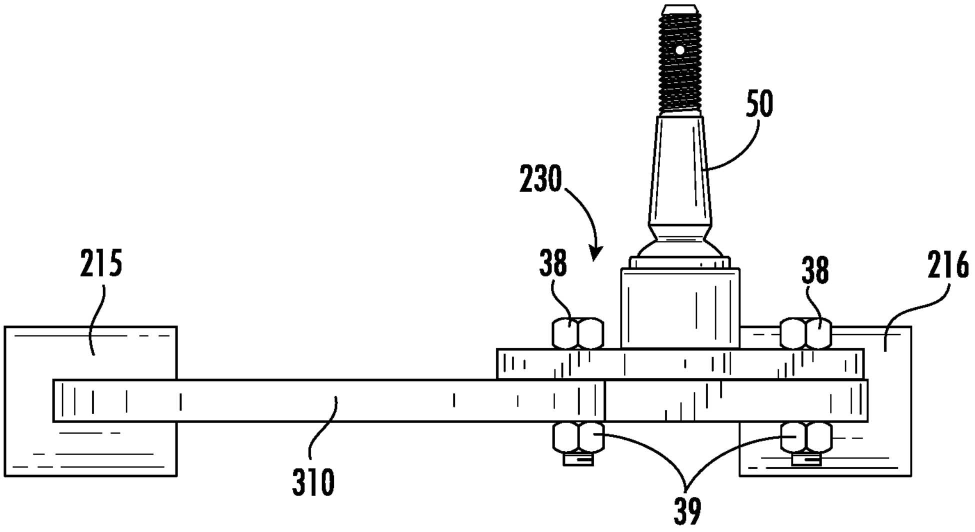
FIG. 25 is a left side view of the adjustable control arm and ball joint assembly in FIG. 19; and, FIG. 26 is a right side view of the adjustable control arm and ball joint assembly in FIG. 19.
Figure 26:
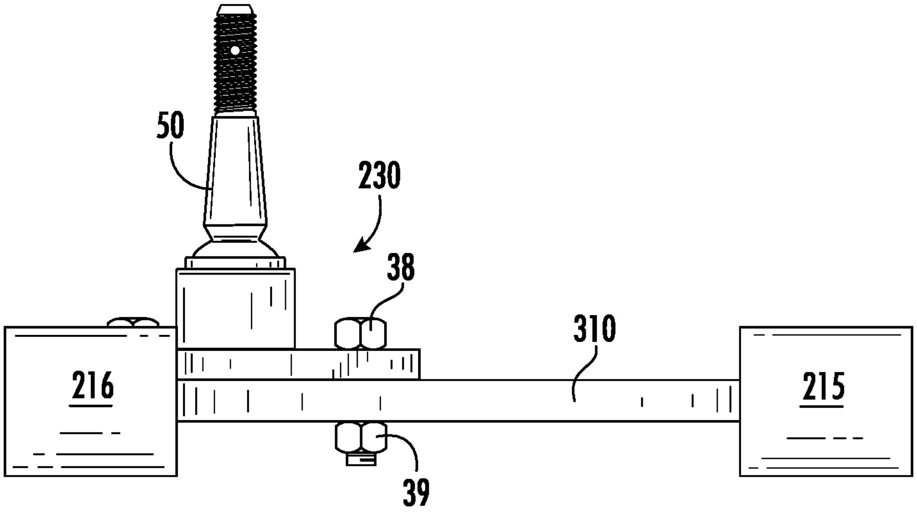

As illustrated in FIG. 12, the ball joint assembly 230 is mounted on the arcuate or arched portion 220 and fastened in place when the desired location for the ball joint is achieved. It will be understood from FIG. 12, that the ball joint assembly 230 may be mounted on the arcuate or arched portion 220 on the surface opposite to that illustrated in FIGS. 10 through 18.

Another adjustable control arm and ball joint assembly 300 is illustrated in FIGS. 19 through 26. The assembly 300 has a frame portion 320 and a ball joint assembly 230 as described previously. The frame 320 has mounting ends 215 and 216, as described previously, to secure the frame 300 to a vehicle.

With reference to FIGS. 19 through 22, it can be seen that the frame of assembly 30 has extensions 310 that extend away from mounting ends 215 and 216 to an arcuate or arched portion 320. The arched portion 320 has a pair of slots 322 and 324 that intersect the slots 232 and 234 which align to receive fasteners. The ball joint carrier 230 is as previously described. This embodiment differs from the prior embodiment 200 illustrate in FIGS. 10-18 in that it permits adjustment in two directions as described in connection with the prior embodiment illustrated in FIGS. 1-9.

What is claimed is:

1. A control arm comprising:

an integrally formed frame having a first portion, with two pivotally connectable arm connecting portions configured to mount to a vehicle body, and a second portion that includes at least three elongated slots, each having a respective major axis that extends in a first direction, for securing a suspension assembly to the frame; and, a suspension assembly that includes at least three elongated slots, each having a major axis that extends in a second direction, for securing the suspension assembly to the frame;

wherein the major axes of the at least three elongated slots in the second portion are parallel to each other and the at least three elongated slots in the second portion are staggered relative to each other, and the major axes of the at least three elongated slots in the suspension assembly are parallel to each other and the at least three elongated slots in the suspension assembly are staggered relative to each other;

whereby the suspension assembly is adjustably positioned on the frame by locating the at least three elongated slots having the major axes in the first direction to intersect the at least three elongated slots having the major axes in the second direction.

2. The control arm of claim 1, wherein the at least three elongated slots in the second portion of the frame each have parallel sides.

3. The control arm of claim 1, wherein the at least three elongated slots in the suspension assembly each have parallel sides.

4. The control arm of claim 1, wherein the at least three elongated slots in the second portion of the frame each have parallel sides and the at least three elongated slots in the suspension assembly each have parallel sides.

5. The control arm of claim 1, wherein the major axes that extend in the first direction are perpendicular to the major axes that extend in the second direction.

6. The control arm of claim 1, wherein a longitudinal direction is defined between the first portion and the second portion, and the longitudinal direction is parallel to the first direction.

7. The control arm of claim 1, wherein the suspension assembly comprises a ball joint assembly.

8. A control arm comprising:

a frame having a first portion, with two pivotally connectable arm connecting portions configured to mount to a vehicle body, and a second portion that includes at least three elongated slots, each having a respective major axis that extends in a first direction, for securing a suspension assembly to the frame; and, a suspension assembly that includes at least two elongated slots, each having a major axis that extends in a second direction, for securing the suspension assembly to the frame;

wherein the major axes of the at least three elongated slots in the second portion are parallel to each other and the at least three elongated slots in the second portion are staggered relative to each other, and the major axes of the at least two elongated slots in the suspension assembly are parallel to each other;

whereby the suspension assembly is adjustably positioned on the frame by locating the at least three elongated slots having the major axes in the first direction to intersect the at least two elongated slots having the major axes in the second direction.

9. The control arm of claim 8, wherein the at least three elongated slots in the second portion of the frame each have parallel sides.

10. The control arm of claim 8, wherein the at least two elongated slots in the suspension assembly each have parallel sides.

11. The control arm of claim 8, wherein the at least three elongated slots in the second portion of the frame each have parallel sides and the at least two elongated slots in the suspension assembly each have parallel sides.

12. The control arm of claim 8, wherein the major axes that extend in the first direction are perpendicular to the major axes that extend in the second direction.

13. The control arm of claim 8, wherein a longitudinal direction is defined between the first portion and the second portion, and the longitudinal direction is parallel to the first direction.

14. The control arm of claim 13, wherein the second direction is perpendicular to the first direction.

15. The control arm of claim 8, wherein the suspension assembly comprises a ball joint assembly.

16. The control arm of claim 15, wherein the ball joint assembly includes a ball joint carrier having a socket and a ball joint stud extending from the socket, and the at least two elongated slots in the suspension assembly are in the ball joint carrier.

17. The control arm of claim 6, wherein the second direction is perpendicular to the first direction.

18. The control arm of claim 7, wherein the ball joint assembly includes a ball joint carrier having a socket and a ball joint stud extending from the socket, and the at least three elongated slots in the suspension assembly are in the ball joint carrier.

* * * * *